US009092484B1

(12) United States Patent
Abraham (10) Patent No.: US 9,092,484 B1
(45) Date of Patent: Jul. 28, 2015

(54) BOOLEAN REORDERING TO OPTIMIZE MULTI-PASS DATA SOURCE QUERIES

(71) Applicant: Vero Analytics, Inc., McLean, VA (US)

(72) Inventor: Ajo Abraham, Vienna, VA (US)

(73) Assignee: Vero Analytics, Inc., McLean, VA (US)

(*) Notice: Subject to any disclaimer, the term of this patent is extended or adjusted under 35 U.S.C. 154(b) by 0 days.

(21) Appl. No.: 14/671,618

(22) Filed: Mar. 27, 2015

(51) Int. Cl.
*G06F 17/30* (2006.01)

(52) U.S. Cl.
CPC .................. *G06F 17/30463* (2013.01)

(58) Field of Classification Search
CPC ............... G06F 17/30463; G06F 17/30466
USPC .......................................................... 707/718
See application file for complete search history.

(56) References Cited

U.S. PATENT DOCUMENTS

| | | | |
|---|---|---|---|
| 5,701,456 A | 12/1997 | Jacopi et al. | |
| 5,778,355 A * | 7/1998 | Boyer et al. | 707/999.002 |
| 5,960,427 A * | 9/1999 | Goel et al. | 707/999.002 |
| 6,006,233 A | 12/1999 | Schultz | |
| 6,411,951 B1 * | 6/2002 | Galindo-Legaria et al. | 707/999.003 |
| 7,533,088 B2 | 5/2009 | Nayak et al. | |
| 7,685,137 B2 | 3/2010 | Liu et al. | |
| 7,774,336 B2 * | 8/2010 | Beyer et al. | 707/718 |
| 7,895,189 B2 | 2/2011 | Balmin et al. | |
| 7,970,782 B1 | 6/2011 | Bedell et al. | |
| 7,984,043 B1 | 7/2011 | Waas | |
| 8,386,404 B2 | 2/2013 | Strizzi et al. | |
| 8,434,027 B2 | 4/2013 | Jones | |
| 8,752,045 B2 | 6/2014 | Fitzgerald et al. | |
| 2002/0188600 A1 * | 12/2002 | Lindsay et al. | 707/3 |
| 2004/0015486 A1 | 1/2004 | Liang et al. | |
| 2009/0106732 A1 | 4/2009 | Hanson et al. | |
| 2009/0259683 A1 | 10/2009 | Murty | |
| 2010/0131565 A1 | 5/2010 | Weinberg et al. | |
| 2011/0161310 A1 * | 6/2011 | Tang et al. | 707/714 |
| 2012/0084278 A1 * | 4/2012 | Franke et al. | 707/719 |

(Continued)

FOREIGN PATENT DOCUMENTS

WO    WO 2009/134449 A2    11/2009

OTHER PUBLICATIONS

Chaudhuri et al. "An overview of Query Optimzation in Relational Systems" PODS '98, pp. 34-43, 1998.*

(Continued)

*Primary Examiner* — Yuk Ting Choi
(74) *Attorney, Agent, or Firm* — Sterne, Kessler, Goldstein & Fox P.L.L.C.

(57) ABSTRACT

In an embodiment, a computer-implemented method optimizes queries. The method includes (a) representing a filter criteria for data in a data source as a first Boolean statement with a plurality of expressions connected by a plurality of logic operators including at least one OR operator and at least one AND operator; (b) determining that an expression in the plurality of expressions is a measure expression; (c) analyzing the first Boolean statement to identify an expression in the plurality of expressions that will be ANDed with results of the determined measure expression; (d) replacing the measure expression determined in (b) with a statement ANDing the measure expression determined in (b) and the expression identified in (c) to determine a second Boolean statement that describes the filter criteria that the first Boolean statement represents; and (e) generating, based on the second Boolean statement, a sequence of queries.

22 Claims, 5 Drawing Sheets

(56) References Cited

U.S. PATENT DOCUMENTS

2012/0089596 A1* 4/2012 Siddiqui et al. ............... 707/718
2013/0226846 A1   8/2013 Li et al.
2014/0181073 A1   6/2014 Wong
2014/0250443 A1* 9/2014 Greiner et al. ................ 719/328
2015/0088856 A1* 3/2015 Hunter et al. ................. 707/714

OTHER PUBLICATIONS

Goel et al. "SQL Query optimization: Reordering for a Genral Class of Queries" SIGMOD '96, pp. 47-56, 1996.*

Fuxman, et al., "ConQuer: efficient management of inconsistent databases", SIGMOD '05 Proceedings of the 2005 ACM SIGMOD International Conference on Management of data, 2005, 12 pages.
"Query Processing." Captured from [http://www.cse.unsw.edu.au/~cs9315/14s2/notes/G/notes.html] on Mar. 4, 2015, 44 pages.
Cabibbo, L., and Torlone, R., "A logical approach to multidimensional databases", Advances in Database Technology—EDBT'98. Springer Berlin Heidelberg, 1998, 15 pages.
Chen, et al. "Graph OLAP: Towards online analytical processing on graphs." Data Mining, 2008. ICDM'08. Eighth IEEE International Conference on IEEE, 2008, 10 pages.

* cited by examiner

BOOLEAN REORDERING TO OPTIMIZE MULTI-PASS DATA SOURCE QUERIES

BACKGROUND

1. Field

This field generally relates to data source query generation.

2. Related Art

Various types of data sources exist, including relational databases, NoSQL databases, and big data sources. Data sources may organize data into tables, where each table may have rows and columns or they may appear to have rows and columns. Each row may represent a record. Each column may have entries for each record of the same data type. A data type may be, for example, a text string, number, or date.

Two example tables—a revenue table and a profit table—are reproduced below. In this example, each table has four columns, three of which are the same: date, product, and customer. Each table also has a column not shared by the other. In particular, for each record, the revenue table has a revenue entry, and the profit table has a profit entry.

Below is an example revenue table, which may be referred to below as Revenue_Fact:

| Date | Product | Customer | Revenue |
| --- | --- | --- | --- |
| Jan. 1, 2014 | Chair | Jay | 10 |
| Jan. 1, 2014 | Chair | Alex | 50 |
| Jan. 1, 2014 | Desk | Alex | 100 |
| Jan. 25, 2014 | Lamp | Jay | 10 |
| Jan. 2, 2014 | Desk | Jane | 100 |
| Jan. 2, 2014 | Lamp | Roger | 5 |
| Jan. 10, 2014 | Chair | Roger | 25 |

Below is an example profit table, which may be referred to below as Profit_Fact:

| Date | Product | Customer | Profit |
| --- | --- | --- | --- |
| Jan. 1, 2014 | Chair | Jay | 5 |
| Jan. 1, 2014 | Chair | Alex | 40 |
| Jan. 1, 2014 | Desk | Alex | 75 |
| Jan. 25, 2014 | Lamp | Jay | 5 |
| Jan. 2, 2014 | Desk | Jane | 75 |
| Jan. 2, 2014 | Lamp | Roger | 1 |
| Jan. 10, 2014 | Chair | Roger | 10 |

Data analysis tools may be used to retrieve data. To retrieve data, data analysis tools may filter data by entities, such as dimension entities and measure entities. Dimensions may refer to entities by which you want to group data. For example, in the above tables, Date, Customer, and Product may be dimension entities because those are fields by which data can be grouped. For example, to determine the total revenue for each product in the Revenue_Fact table, the records must be grouped on product. Because all the records in the table have one of three products (chair, lamp, and desk), the result may have three rows, each listing the total revenue for one of the three products.

Measure entities may refer to formulas calculated by applying an aggregation function to a column in a database table. An aggregation function examines multiple rows of a table, perhaps in a group, as an input to determine a value. For example, a measure entity to determine total revenue may have the formula sum(revenue). If the records are grouped by product, the result may be the total revenue provided by each product. In addition to sum, other example aggregation functions include, but are not limited to, average, count, maximum, minimum, median, and mode.

One widely adopted way to retrieve data from databases is to use structured query language (SQL). SQL can be quite sophisticated and complex. To help users manage the complexity, many data analysis tools automatically generate SQL. Returning to the example above, to determine the total revenue provided by each product, the following SQL query may be used:

Select
Product,
sum(revenue)
From
Revenue_Fact
Group By
Product

SQL provides two primary ways of filtering out records: the WHERE clause and the HAVING clause. In the example above, a filter may be used to identify which products have a total profit exceeding 10. In SQL, the filter may be represented using a HAVING clause, as set out below:

Select
Product
From
Profit_Fact
Group By
Product
Having
Sum(profit)>10

For some questions, multiple queries may be needed of the database. These may be referred to as multi-pass queries. But often these multi-pass queries are inefficient or inaccurate. Methods and systems are needed to improve multi-pass query processing.

BRIEF SUMMARY

In an embodiment, a computer-implemented method optimizes queries. The method includes: (a) representing a filter criteria for data in a data source as a first Boolean statement with a plurality of expressions connected by a plurality of logic operators including at least one OR operator and at least one AND operator; (b) determining that an expression in the plurality of expressions is a measure expression; and (c) analyzing the first Boolean statement to identify an expression in the plurality of expressions that will be ANDed with results of the determined measure expression. The method further includes: (d) replacing the measure expression determined in (b) with a statement ANDing the measure expression determined in (b) and the expression identified in (c) to determine a second Boolean statement that describes the filter criteria that the first Boolean statement represents; and (e) generating, based on the second Boolean statement, a sequence of queries formatted for transmission to the data source such that the replacing (d) causes an earlier query in the sequence of queries to avoid retrieval of a record that a later query excludes.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

As mentioned above, multi-pass queries are often inefficient. For example, earlier queries return data that later queries render unnecessary. This additional data retrieval can consume computing resources such as bandwidth, processing power, and memory. For that reason, embodiments rewrite the user's query constraints to produce more efficient multi-pass queries. In particular, embodiments determine a measure expression and analyze a user's query to identify which dimension expressions are ultimately ANDed with the measure expression. In the user's query, embodiments substitute out the measure expression with another expression that ANDs the measure expression with the identified dimension expressions. In this may have the effect of making the queries more complicated. But, because the more complicated queries return fewer unnecessary records that would ultimately get filtered out, data retrieval is more efficient.

Figure 1:
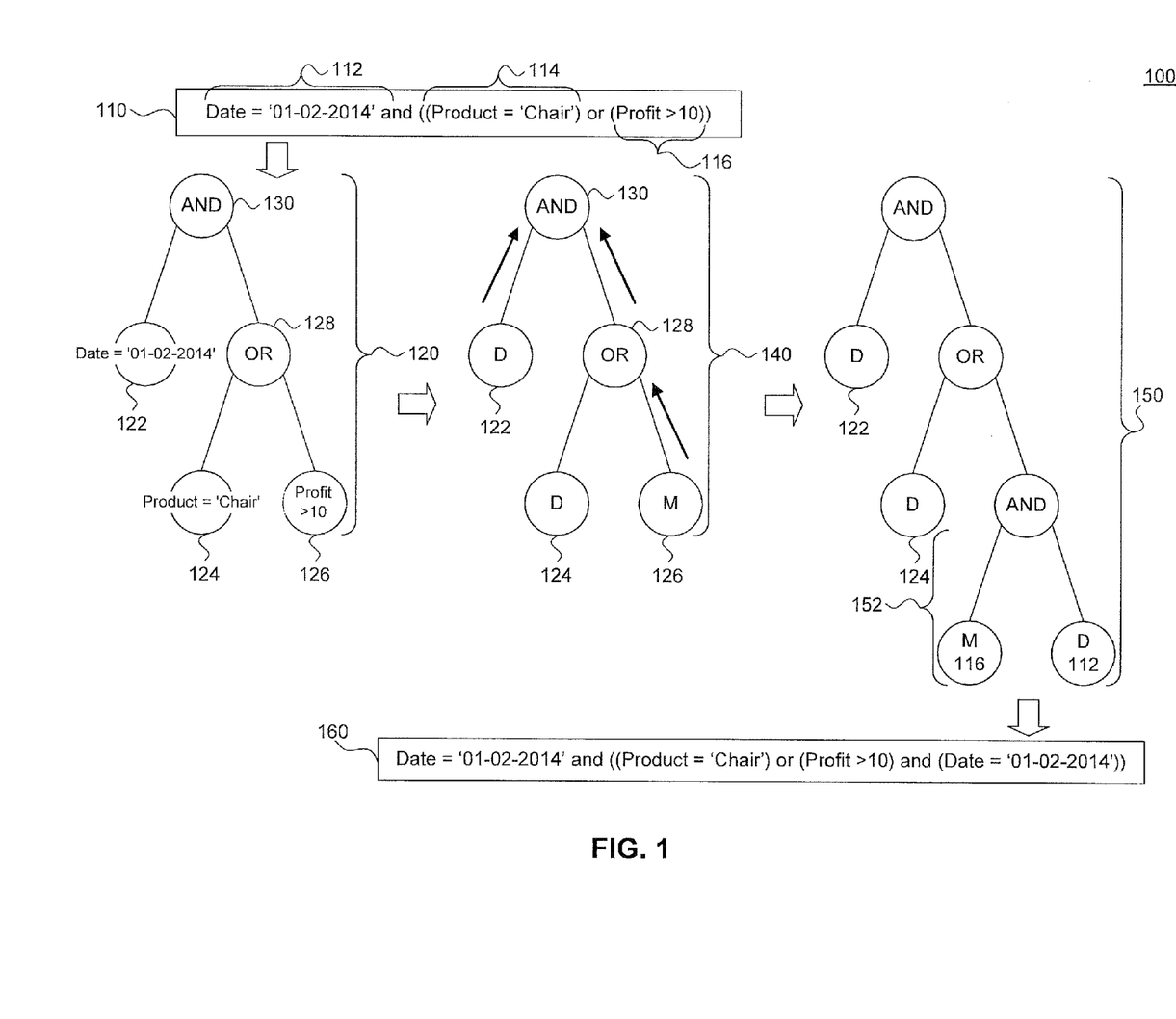
FIG. 1 is a diagram illustrating translation of data filters to optimize multi-pass queries, according to an embodiment.

FIG. 1 is a diagram 100 illustrating an example of rewriting queries, according to an embodiment. In this example, a user seeks the total revenue for particular date, in this example Jan. 2, 2014, from products that are either a chair or have a total profit exceeding 10. In diagram 100, that query is represented by Boolean statement 110: "Date='01-02-2014' AND (Product='Chair' OR Profit>10))".

To execute a query for filter criteria represented by Boolean statement 110, some data analysis tools may produce the following sequence of two queries, perhaps only after corrective user intervention:

Step 1:
Create temp table step1 as (
Select
Product
From
Profit_Fact
Group By
Product
Having
Sum(profit)>10)

Step 2:
Select
Product,
sum(revenue)
From
Revenue_Fact f
Where
(Product='Chair' OR
Exists (select * from step1 s s.Product=f.Product))
AND
Date='01-02-2014'

The first step in in the sequence of queries executes the profit aggregation function on the Profit_Fact table. It determines which products have a total profit of greater than 10. The second step in the sequence of queries executes the revenue aggregation function on the Revenue_Fact table. It queries the revenue table for products and total revenue on Jan. 2, 2014 where the product is a chair or the product exists in the results of the first query.

This multi-pass query is inefficient because the first query returns records that are ultimately eliminated by the second. In particular, the first query returns records for all dates when the second queries only interested in records for Jan. 2, 2014. As a result the temporary table created from the first step may be larger than necessary and may take longer to process. Also, the query in step 2 may take longer to execute because it has to review more records in the temporary table.

Embodiments here rewrite the first query to focus it on records for Jan. 2, 2014. Thus, results from the first query may be fewer, and query processing may be more efficient.

For example, referring back to FIG. 1, Boolean statement 110 has three expressions: expression 112 specifying that the date is Jan. 2, 2004, expression 114 specifying that the product is a chair, and expression 116 specifying that total profit exceeds 10. As illustrated in diagram 100, three expressions can be organized in a tree, illustrated as tree 120. In tree 120, expression 114 ("Product='Chair'") is ORed with expression 116 ("Profit>10"). The result of that intersection is then ANDed with expression 112 ("Date='01-02-2014'"). In the tree, expressions 112, 114, 116 are represented by nodes 122, 124, 126 respectively. Expressions 112, 114, 116 are represented as leaf nodes, and the leaf nodes are connected using nodes representing the operators. Because expression 114 and 116 are ORed, the nodes representing those expressions (nodes 124 and 126) are connected using an OR operator node 128. And because the result of that OR operation is ANDed with expression 112, the OR operator node 128 and expression node 122 are connected via an AND operator node 130. Because AND operator node 130 is at the top of the tree, it is the root node for tree 120.

Of the three expressions, two are dimensions, and one is a measure. Expressions 112 and 114 are dimensions because they group records, and expression 116 is a measure because it aggregates records, summing up profit entries.

According to an embodiment, tree 120 is traversed to identify expressions that will be ANDed with results of the measure expression 116. In diagram 100, this is illustrated by the arrows in a tree 140. Traversing up tree 140 from expression 116's node 126, node 126's parent is operator node 128. Because operator node 128 is for an OR operator, embodiments continue to traverse upward to operator 130. Because operator 124 is an AND operator, any child expression, in this case node 122 representing expression 112, is identified as an expression that will be ANDed with the results of the measure expression 116.

Having identified a dimension expression 112 that will be ANDed with the results of the measure expression 116, dimension expression 112 is distributed to combine with measure expression 116 lower in the tree. In diagram 100, this is illustrated by a modified tree 150. Modified tree 150 is similar to tree 120 except node 126 for expression 116 is replaced by a sub-tree 152. Sub-tree 152 ANDs measure expression 116 and dimension expression 112.

Tree 150 is then converted back to a Boolean statement, illustrated as statement 160: "Date='01-02-2014' AND (Product='Chair' OR ((Profit>10) AND (Date='01-02-2014')))."

Boolean statement 160 can then be converted to queries formatted according to a language understandable by the database, for example SQL. Converting Boolean statement 160 to SQL may generate the following sequence of queries:

Step 1:
Create temp table step1 as (
Select
Product
From
Profit_Fact
Where
Date='01-02-2014'
Group By
Product
Having
Sum(profit)>10)

Step 2:
Select
Product,
sum(revenue)
From
Revenue_Fact f
Where
(Product='Chair' OR
Exists (select * from step1 s s.Product=f.Product))
AND
Date='01-02-2014'

Comparing these two queries with the less efficient example sequence above, the query in the first pass differs. In particular, an additional filter "Where Date='01-02-2014'" is added. This additional filter has the effect of excluding from the first query, and thus from a temporary table, data that would later be excluded anyway by the second query. This is described in more detail with respect to the flowcharts in FIGS. 2 and 3.

Figure 2:
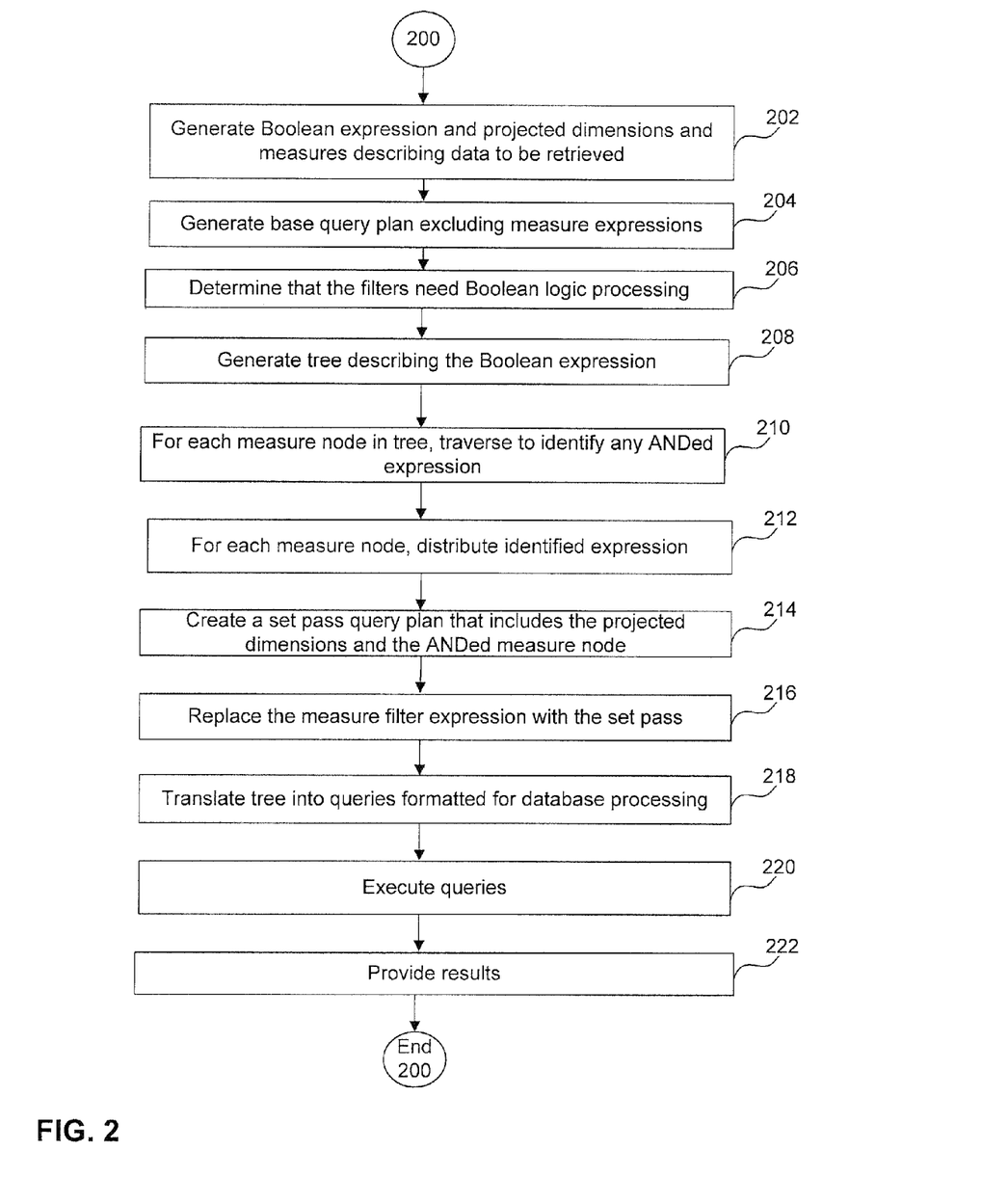
FIG. 2 is a flowchart illustrating a method for optimizing multi-pass queries, according to an embodiment.

FIG. 2 is a flowchart illustrating a method 200 for optimizing multi-pass queries, according to an embodiment (steps 202-222). Method 200 begins at step 202 by generating a Boolean expression describing data to be retrieved. The Boolean expression may have measure and dimension filters and may be specified by or selected by the user with a graphical user interface.

At step 204, a base query plan is generated. The base query plan may exclude measure expressions in the filter. Any measure expressions may be stored for further processing in step 210. Determining the base query plan may involve determining whether multiple queries, or passes, are necessary. Multiple queries may be necessary, for example, when data is to be searched from multiple tables from the data source. The multiple queries may be structured to intersect data from a first table with data from a second table.

At step 206, whether the filters in the Boolean expression need additional Boolean logic processing is determined. For example, if measure expressions are present, additional Boolean logic processing may be used if the base plan is multi-pass, or the measure filter will force a multi-pass, or a dimension and a measure is ORed. Further, the additional Boolean logic processing may be used when the measure expressions are subject to an OR operator, and the result of the OR operation is subject to an AND operator.

When additional Boolean logic processing is needed at step 206, process 200 continues to step 208. At step 208, a tree describing the Boolean expression is generated. The tree includes internal nodes that represent the plurality of logic operators and leaf nodes that represent the plurality of expressions.

Figure 3:
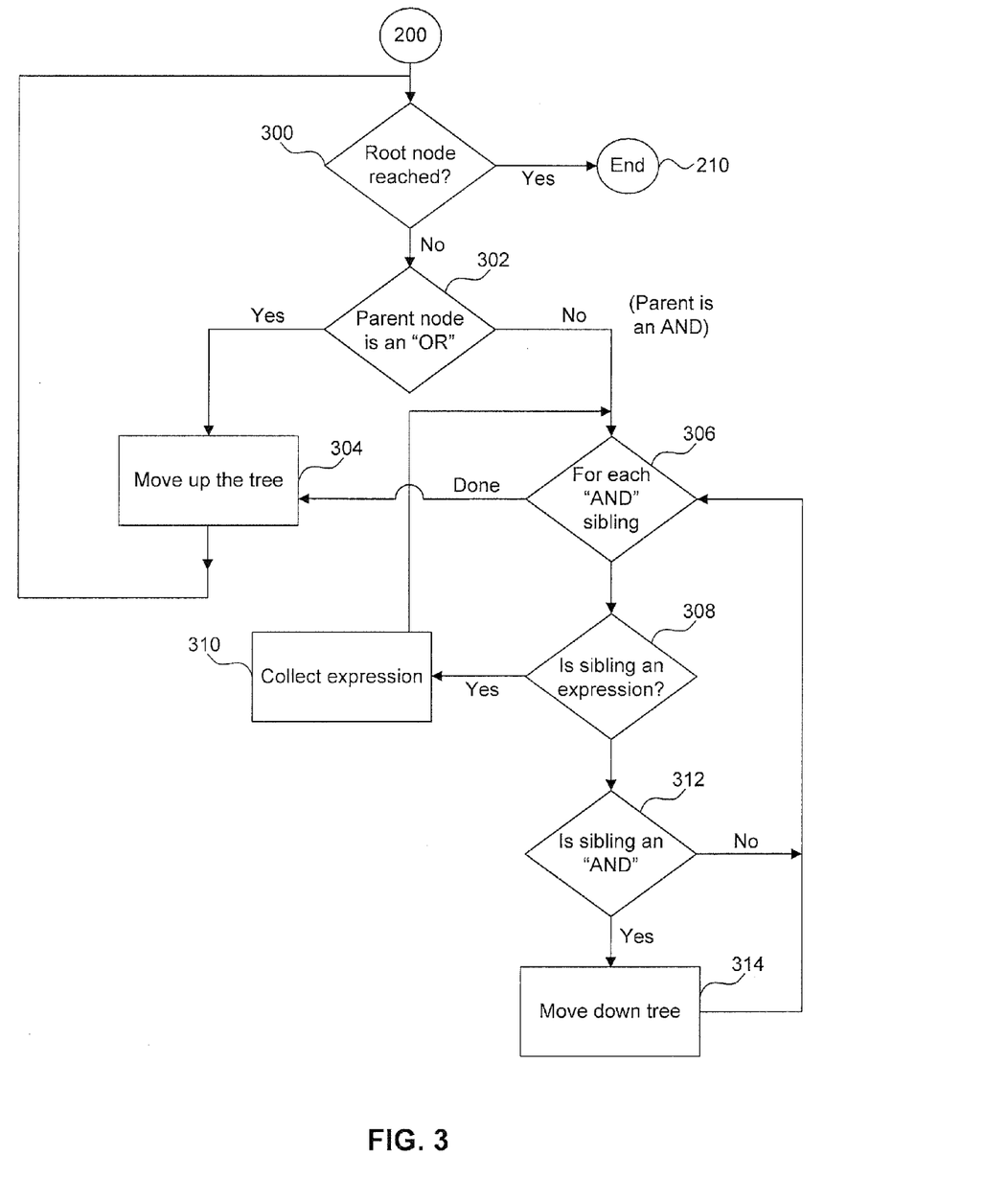
FIG. 3 is flowchart illustrating traversing a tree of expressions to identify any ANDed expression, according to a step of the method in FIG. 2.

At step 210, the tree determined at step 208 is traversed. For each measure expression, the tree is traversed to identify any expression in the plurality of expressions that will be ANDed with results of the determined measure expression. Example operation of step 210 is illustrated in FIG. 3 described below.

For each measure node, the corresponding expressions identified in step 210 are distributed at step 212. Distributing may involve replacing the measure expression with a statement ANDing: (i) the measure expression and (ii) any expression identified at step 210. As result of the replacement, another Boolean statement may be determined. The other Boolean statement may describe the same filter criteria as the Boolean statement of step 202, but may describe how to retrieve the filtered data more efficiently.

At steps 214 and 216, the query plan may be updated to reflect the new Boolean statement determined at step 212. This may involve creating a set pass query plan that includes the projected dimensions and the ANDed measure node at step 214. And at step 216, the measure filter expression is replaced with the set pass query determined at step 214.

At step 218, the query plan is translated into a format, such as SQL, understandable by the data source. Other possible formats include but are not limited to Cypher, Pig, Python, Scala, or Java code.

Finally, at step 220, the queries are executed on the data source, and, at step 222, the data source provides results. With that, method 200 terminates.

Figure 4:
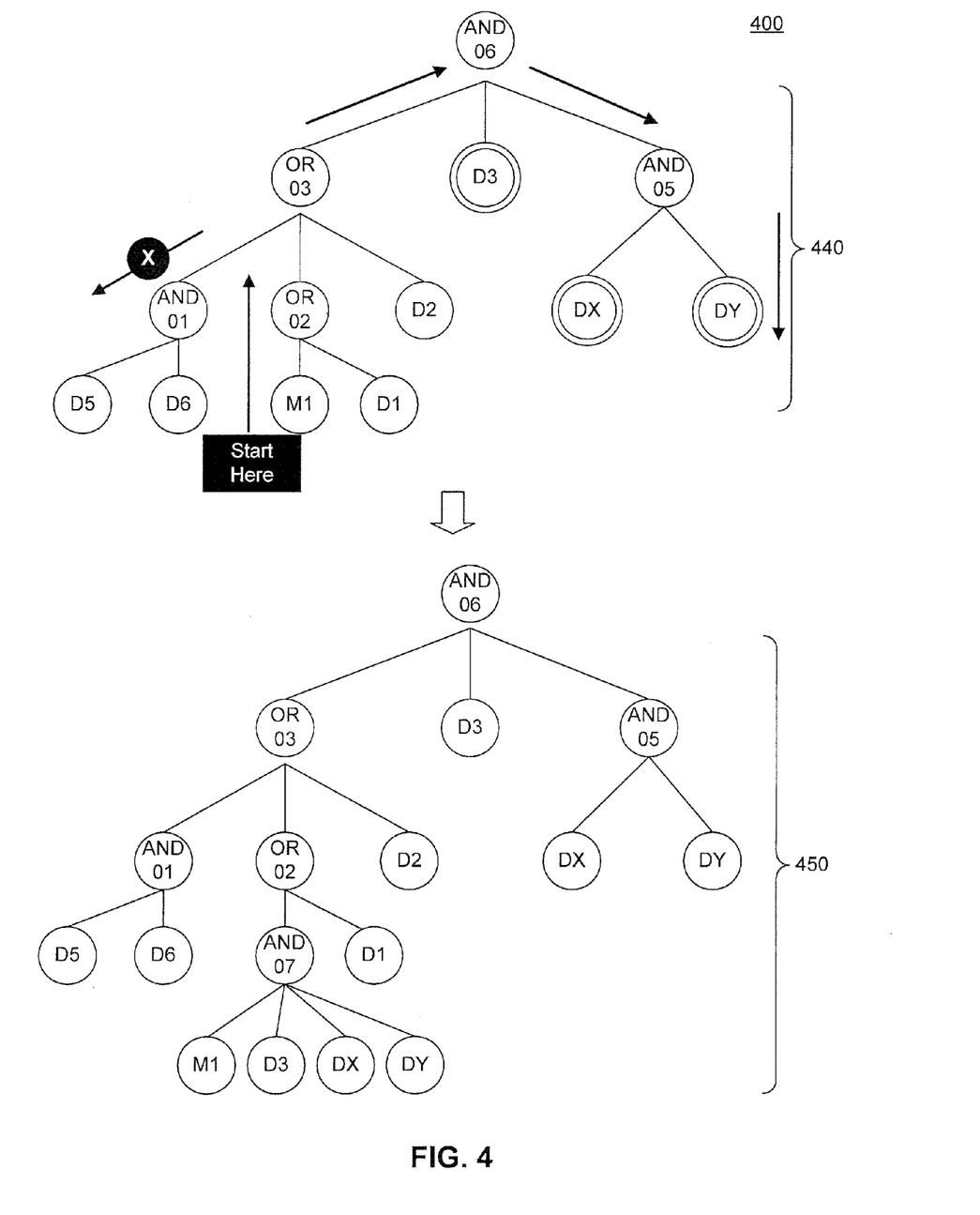
FIG. 4 is a diagram illustrating an example of translating an expression tree to optimize multi-pass queries, according to an embodiment.

FIG. 3 is flowchart illustrating in greater detail method 200's step 210, here routine 210, that traverses a tree to identify any ANDed expression. Routine 210 is described with respect to the example tree illustrated in FIG. 4. FIG. 4 is illustrates a diagram 400 illustrating example tree operations, according to an embodiment. Diagram 400 includes a tree 440.

Routine 210 is structured as a loop that starts at a measure node, illustrated in diagram 400 as node M1, and repeats until a root OR node is reached or when all valid paths have been traversed, as illustrated by decision block 300. Because node M1 is not the root node, the process continues to decision block 302.

Decision block 302 determines whether the parent node represents an OR operation. If the parent node represents an OR operation, the routine moves up the tree at step 304. If the parent node does not represent an OR operation, or perhaps represents an AND operation, the routine continues to decision block 306.

Looking at FIG. 4, node M1's parent is an OR operator, so routine 210 moves up the tree to node O2 at step 304. Node O2 is not the root node (decision block 300) and node O2's parent is an OR operator (decision block 302). Thus, routine 210 returns to step 304 to move up the tree again to node O3.

Node O3 is not a root node, but its parent an AND operator, not an OR operator. So, routine 210 continues to decision block 306 to repeat for each of node 404's siblings. If the sibling is an expression (decision block 308), the expression is collected at step 310. And if the sibling is an AND operator (decision block 312), routine 210 moves down the tree at step 314.

Node O3 has two siblings: nodes D3 and O5. Because node D3 represents an expression, that expression is collected at step 310. And because node O5 is an AND operator, routine 210 moves down a tree at step 314.

Having moved down the tree at step 314, routine 210 again repeats for each AND sibling at decision block 306, this time at a lower level of the tree. Node 406 has two children, nodes Dx and Dy. Both are determined to be expressions at decision block 308, and so both are collected at step 310.

Having completed the subroutine for each sibling of nodes Dx and O2 (decision block 306), and having traversed all valid paths routine 210 is completed. In this way, routine 210, when applied to tree 440 in FIG. 4, collects three dimensions nodes: D3, Dx, and Dy.

In sum, routine 210 includes a loop that traverses through all valid paths. The loop starts at the measure node and works its way up to the root node. To be clear, the root can be an And/OR node. If AND then we traverse down any sibling AND nodes. We only stop if the root is OR or if all paths have been traversed.

Referring to FIG. 4, measure node M1 is replaced by a sub-tree ANDing measure node M1 with the collected dimension nodes: D3, Dx, and Dy. FIG. 4 illustrates the resulting tree as a tree 450.

Tree 450 is mathematically equivalent to tree 400. To illustrate, the original Boolean expressions of tree 400 was D3(DXDY)(D2+D5D6+(M1+D1). Applying distributive law to that Boolean expression, the result is D3DXDYD2+ D3DXDYD5D6+D3DXDYM1+D3DXDYD1. Replacing M1 with the expression discovered above (M1D3DXDY) results in the same expression. In particular, replacing M1 with M1D3DXDY results in D3DXDYD2+ D3DXDYD5D6+D3DXDYM1D3DXDY+D3DXDYD1.

But, identity law states that, when two equivalent expressions are ORed with each other, it is as if no operation had occurred at all. For example, identity law states that D3D3=D3. Applying identity law to the replaced equation allows removal of D3DXDY, resulting in the same distributed equation: D3DXDYD2+D3DXDYD5D6+D3DXDYM1+ D3DXDYD1. Thus, tree 450 is mathematically equivalent to tree 400.

Figure 5:
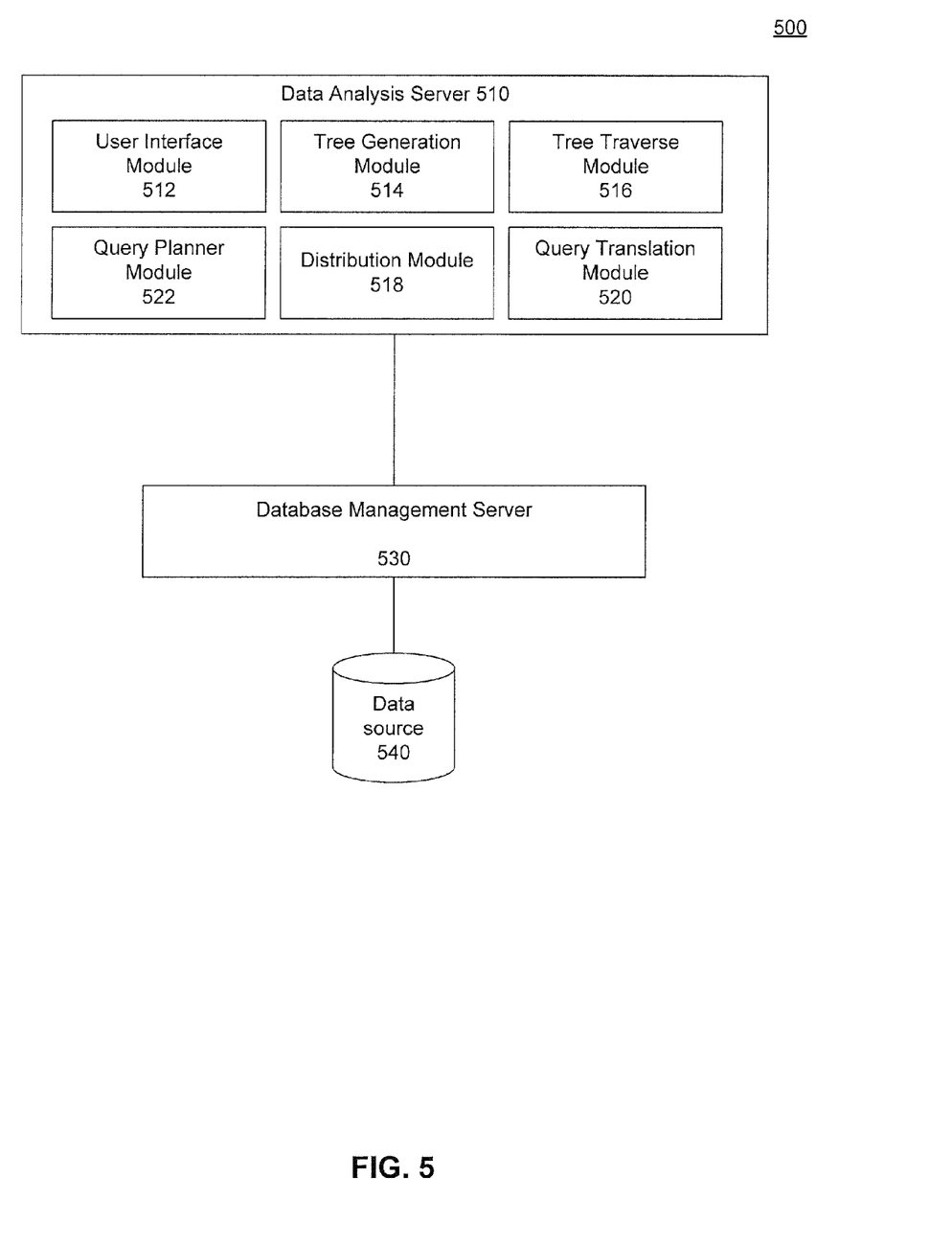
FIG. 5 is a diagram illustrating a system for optimizing multi-pass queries, according to an embodiment.

FIG. 5 is a diagram illustrating a system 500 for optimizing multi-pass queries, according to an embodiment. System 500 includes a data analysis server 510 coupled to a database management server 530, which is in turn coupled to a data source 540. System 500 may operate as described above with respect to FIG. 2. In particular, in one embodiment not intended to be limiting, data analysis server 510 executes steps 202-218, and database management server 530 executes steps 220-222.

Data analysis server 510 includes six modules: a user interface module 512, a query planner module 522, a tree generation module 514, a tree traverse module 516, a distribution module 518, and a query translation module 520. User interface module 512 may execute step 202; query planner module 522 may execute steps 204, 206, 214 and 216; tree generation module 514 may execute step 208; tree traverse module 516 may execute step 210; distribution module 518 may execute step 212; and query translation module 520 may execute step 218. Each module is addressed in turn.

User interface module 512 receives a filter criteria for data to be retrieved from a data source. User interface module 512 may represent the filter criteria as a Boolean statement with expressions connected by logic operators, such as an OR operator and AND operator. The expressions may be dimensions or measures.

Query planner module 522 generates a base query plan. The base query may exclude filter measure expressions. Determining the base query plan may involve determining whether multiple queries, or passes, are necessary. Query planner module 522 determines that an expression received by user interface module 512 is a measure expression.

Tree generation module 514 generates a tree representing the first Boolean statement. The tree includes internal nodes representing the logic operators received by user interface module 512 and leaf nodes representing the expressions received by user interface module 512.

Tree traverse module 516 is an analysis module that analyzes the Boolean statement to identify an expression in the plurality of expressions that will be ANDed with results of the determined measure expression. To identify the expressions, tree traverse module 516 traverses the tree starting at a leaf node representing the determined measure expression. Tree traverse module 516 may operate as described above with respect to FIG. 3.

Distribution module 518 replaces the measure expression determined by the tree generation module with a another statement. The other statement ANDs the measure expression determined by the generation module and the expression identified by the traverse module to determine a second Boolean statement that describes the filter criteria that the first Boolean statement represents.

Query translation module 520 generates, based on the second Boolean statement, a sequence of queries. The sequence of queries is formatted for transmission to the data source such that the distribution module's replacement causes an earlier query in the sequence of queries to avoid retrieval of a record that a later query excludes.

Database management server 530 receives the queries and executes them on data source 540 for retrieve data.

CONCLUSION

Multi-pass queries and a sequence of queries, as described herein include both separate queries with intermediate results stored in a temporary table, and illustrated in the example above, and queries that can include a derived expression or sub-query.

Each of the servers and modules in FIG. 5 may be implemented in hardware, software, firmware, or any combination thereof.

Each of the servers and modules in FIG. 5 may be implemented on the same or different computing devices. Such computing devices can include, but are not limited to, a personal computer, a mobile device such as a mobile phone tablet device or laptop device, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for query optimization, comprising:
   (a) representing a filter criteria for data in a data source as a first Boolean statement with a plurality of expressions connected by a plurality of logic operators including at least one OR operator and at least one AND operator;
   (b) determining, by a computing device, that an expression in the plurality of expressions is a measure expression;
   (c) analyzing, by the computing device, the first Boolean statement to identify an expression in the plurality of expressions that will be ANDed with results of the determined measure expression;
   (d) replacing, by at least one computing device, the measure expression determined in (b) with a statement ANDing the measure expression determined in (b) and the expression identified in (c) to determine a second Boolean statement that describes the filter criteria that the first Boolean statement represents; and
   (e) generating, by the computing device and based on the second Boolean statement, a sequence of queries formatted for transmission to the data source such that the replacing (d) causes an earlier query in the sequence of queries to avoid retrieval of a record that a later query excludes.

2. The method of claim 1, wherein the sequence of queries includes (i) a first query that retrieves data for a dimension criteria expression in the plurality of expressions filtered by the measure expression, and (ii) a second query that is to be executed after the first query and that intersects data from the data source with data retrieved with the first query.

3. The method of claim 1, further comprising:
   (f) generating a tree representing the first Boolean statement, the tree including internal nodes representing the plurality of logic operators and leaf nodes representing the plurality of expressions,
   wherein the analyzing (c) comprises traversing the tree starting at a leaf node representing the determined measure expression.

4. The method of claim 2, wherein the traversing the tree comprises repeatedly, until a root node is reached:
   (i) moving up a level the tree to determine a parent node;
   (ii) determining whether the parent node is an AND operator;
   (iii) if the parent node is an AND operator, identifying each child expression of the parent node as an expression in the plurality of expressions that will be ANDed with results of the determined measure expression.

5. The method of claim 4, wherein the traversing the tree comprises further comprises repeatedly, until a root node is reached:
   (iv) if the parent node is an AND operator, identifying each child operator of the parent node that is an AND operator;
   (v) for each child operator identified in (iv), traversing down the tree starting at the child operator to determine which expressions in the child operator's branch of the tree will be ANDed with results of the determined measure expression.

6. The method of claim 5, wherein the traversing down the tree (v) comprises:
   (1) moving down a level the tree to the child operator; and
   (2) until a leaf node is reached, repeating steps (iii)-(v).

7. The method of claim 1, wherein the determining (b) comprises determining a plurality of measured expressions, and further comprising:
   (f) repeating steps (c) and (d) for each of the plurality of measured expressions.

8. The method of claim 1, wherein the determining (b) comprises determining that the expression in the plurality of expressions is a measure expression based on whether the measure expression includes an aggregation operation.

9. The method of claim 8, wherein the aggregation operation is a function where the values of multiple rows of a table are grouped together as input to determine a value.

10. The method of claim 1, wherein the generating (e) comprises generating a plurality of Structured Query Language queries.

11. A system for query optimization, comprising:
    a computing device;
    an interface module, implemented on the computing device, that represents a filter criteria for data in a data source as a first Boolean statement with a plurality of expressions connected by a plurality of logic operators including at least one OR operator and at least one AND operator;
    a query planner module, implemented on the computing device, that determines that an expression in the plurality of expressions is a measure expression;
    a traverse module, implemented on the computing device, that analyzes the first Boolean statement to identify an expression in the plurality of expressions that will be ANDed with results of the determined measure expression;
    a distribution module, implemented on the computing device, that replaces the measure expression determined by the query planner module with a statement ANDing the measure expression determined by the query planner module and the expression identified by the traverse module to determine a second Boolean statement that describes the filter criteria that the first Boolean statement represents; and
    a query translation module, implemented on the computing device, that generates, based on the second Boolean statement, a sequence of queries formatted for transmission to the data source such that the distribution module's replacement causes an earlier query in the sequence of queries to avoid retrieval of a record that a later query excludes.

12. The system of claim 11, wherein the sequence of queries includes (i) a first query that retrieves data for a dimension criteria expression in the plurality of expressions filtered by the measure expression, and (ii) a second query that is to be executed after the first query and that intersects data from the data source with data retrieved with the first query.

13. The system of claim 11, further comprising a tree generation module that generates a tree representing the first Boolean statement, the tree including internal nodes representing the plurality of logic operators and leaf nodes representing the plurality of expressions, and
   wherein the traverse module comprises a tree traverse module that traverses the tree starting at a leaf node representing the determined measure expression.

14. The system of claim 13, wherein the tree traverse module repeatedly, until a root node is reached:
   (i) moves up a level the tree to determine a parent node;
   (ii) determines whether the parent node is an AND operator;
   (iii) if the parent node is an AND operator, identifies each child expression of the parent node as an expression in the plurality of expressions that will be ANDed with results of the determined measure expression.

15. The system of claim 14, wherein the tree traverse module also repeatedly, until a root node is reached:
   (iv) if the parent node is an AND operator, identifies each child operator of the parent node that is an AND operator;
   (v) for each child operator identified in (iv), traverses down the tree starting at the child operator to determine which expressions in the child operator's branch of the tree will be ANDed with results of the determined measure expression.

16. The system of claim 15, wherein the tree traverse module traverses down the tree (v) by:
   (1) moving down a level the tree to the child operator; and
   (2) until a leaf node is reached, repeating steps (iii)-(v).

17. The system of claim 11, wherein the query planner module determines a plurality of measure expressions, and wherein the traverse and distribution modules repeat for each of the plurality of measure expressions.

18. The system of claim 11, wherein the query planner module determines that the expression in the plurality of expressions is a measure expression based on whether the measure expression includes an aggregation operation.

19. The system of claim 18, wherein the aggregation operation is a function where the values of multiple rows of a table are grouped together as input to determine a value.

20. The system of claim 11, wherein the query translation module generates a plurality of Structured Query Language queries.

21. A program storage device tangibly embodying a program of instructions executable by at least one machine to perform a method for query optimization, said method comprising:
   (a) representing a filter criteria for data in a data source as a first Boolean statement with a plurality of expressions connected by a plurality of logic operators including at least one OR operator and at least one AND operator;
   (b) determining that an expression in the plurality of expressions is a measure expression;
   (c) analyzing the first Boolean statement to identify an expression in the plurality of expressions that will be ANDed with results of the determined measure expression;
   (d) replacing the measure expression determined in (b) with a statement ANDing the measure expression determined in (b) and the expression identified in (c) to determine a second Boolean statement that describes the filter criteria that the first Boolean statement represents; and
   (e) generating, based on the second Boolean statement, a sequence of queries formatted for transmission to the data source such that the replacing (d) causes an earlier query in the sequence of queries to avoid retrieval of a record that a later query excludes.

22. The program storage device of claim 21, wherein the sequence of queries includes (i) a first query that retrieves data for a dimension criteria expression in the plurality of expressions filtered by the measure expression, and (ii) a second query that is to be executed after the first query and that intersects data from the data source with data retrieved with the first query.

* * * * *

UNITED STATES PATENT AND TRADEMARK OFFICE
CERTIFICATE OF CORRECTION

PATENT NO. : 9,092,484 B1
APPLICATION NO. : 14/671618
DATED : July 28, 2015
INVENTOR(S) : Ajo Abraham It is certified that error appears in the above-identified patent and that said Letters Patent is hereby corrected as shown below:

Title Page, Item (73) replace "Vero Analyties, Inc., McLean, VA (US)" with --Vero Analytics, Inc., McLean, VA (US)--

Signed and Sealed this
Twelfth Day of January, 2016

Michelle K. Lee
*Director of the United States Patent and Trademark Office*